United States Patent [19]

Schmidt et al.

[11] Patent Number: 6,079,796
[45] Date of Patent: Jun. 27, 2000

[54] HYDRAULIC BRAKE SYSTEM FOR A VEHICLE

[75] Inventors: Guenther Schmidt, Tauberbischofsheim; Jurgen Breitenbacher, Winterbach; Hans-Jorg Wolff, Schorndorf; Rainer Heinsohn, Tamm; Andreas Klug, Leonberg; Hermann Kaess, Tamm; Peter Zeiner, Stuttgart, all of Germany

[73] Assignee: Robert Bosch GmbH, Stuttgart, Germany

[21] Appl. No.: 09/000,167

[22] PCT Filed: May 12, 1997

[86] PCT No.: PCT/DE97/00951

§ 371 Date: Aug. 11, 1998

§ 102(e) Date: Aug. 11, 1998

[87] PCT Pub. No.: WO97/43152

PCT Pub. Date: Nov. 20, 1997

[30] Foreign Application Priority Data

May 14, 1996 [DE] Germany ............................ 196 19 392
Dec. 19, 1996 [DE] Germany ............................ 196 52 978

[51] Int. Cl.⁷ .................................. B60T 8/34; B60T 8/40
[52] U.S. Cl. ..................................... 303/113.2; 303/116.1; 303/11
[58] Field of Search ........................ 303/113.2, 116.1, 303/116.2, 187, 11, 119.2

[56] References Cited

U.S. PATENT DOCUMENTS

| | | | |
|---|---|---|---|
| 4,875,741 | 10/1989 | Ozawa et al. ............................ | 303/116 |
| 5,011,238 | 4/1991 | Brown, Jr. .............................. | 303/116 |
| 5,180,216 | 1/1993 | Kirstein ................................ | 303/113.2 |
| 5,205,623 | 4/1993 | Holzmann et al. ..................... | 303/113.2 |
| 5,211,454 | 5/1993 | Schaefer et al. ....................... | 303/113.2 |
| 5,261,730 | 11/1993 | Steiner et al. ......................... | 303/113.4 |
| 5,275,477 | 1/1994 | Schaefer et al. ....................... | 303/113.2 |
| 5,383,718 | 1/1995 | Burgdorf et al. ..................... | 303/113.2 |
| 5,390,994 | 2/1995 | Jonner et al. ......................... | 303/113.2 |
| 5,397,174 | 3/1995 | Willmann ............................... | 303/113.5 |
| 5,403,076 | 4/1995 | Altmann et al. ....................... | 303/111 |
| 5,484,194 | 1/1996 | Reinartz et al. ....................... | 303/116.2 |
| 5,496,099 | 3/1996 | Resch ................................... | 303/114.1 |
| 5,501,514 | 3/1996 | Resch ................................... | 303/115.4 |
| 5,505,529 | 4/1996 | Seigel et al. ......................... | 303/116.2 |
| 5,529,388 | 6/1996 | Yasui ................................... | 303/116.1 |
| 5,538,336 | 7/1996 | Reuter et al. ......................... | 303/119.2 |
| 5,547,266 | 8/1996 | Beck et al. ........................... | 303/113.2 |
| 5,567,022 | 10/1996 | Linkner, Jr. .......................... | 303/87 |
| 5,664,849 | 9/1997 | Burgdorf et al. ..................... | 303/116.1 |

*Primary Examiner*—Robert J. Oberleitner
*Assistant Examiner*—Jeffrey Woller
*Attorney, Agent, or Firm*—Ronald E. Greigg; Edwin E. Greigg

[57] ABSTRACT

The invention relates to a hydraulic brake system of a vehicle comprising one wheel brake valve preceding each wheel brake cylinder and one return feed pump connected parallel to each of the wheel brake valves and connected to the suction sides of the wheel brake cylinders. For anti-lock control, the return feed pump is put into operation, and by clocked triggering of a wheel brake valve of a vehicle wheel that is tending to lock, the brake fluid pressure in the wheel brake cylinder of this vehicle wheel is modulated. To realize a traction control device, the invention sets forth a switchover valve in a brake line from the master brake cylinder to the wheel brake cylinder of a driven vehicle wheel. By closing the switchover valves and driving the return feed pump brake fluid can be aspirated from the master brake cylinder by the wheel brake valve of the non-driven vehicle wheel and pumped into the wheel brake cylinder of the driven vehicle wheel, and by this feed pump a brake force can be generated in order to avert spinning of the vehicle wheel.

14 Claims, 3 Drawing Sheets

HYDRAULIC BRAKE SYSTEM FOR A VEHICLE

PRIOR ART

The invention relates to a hydraulic brake system for a vehicle for anti-lock control.

U.S. Pat. No. 4,875,741 discloses a hydraulic brake system for a vehicle with an anti-lock control unit. The known vehicle brake system has a tandem master brake cylinder, to which two independent but analogously constructed brake circuits are connected, with each of which one driven vehicle wheel and one non-driven vehicle wheel can be braked. In each brake circuit, a branching brake line leads from the master brake cylinder to wheel brake cylinders of the vehicle driven vehicle wheel and the non-driven wheel. Each wheel brake cylinder is preceded by a wheel brake valve. Also associated with each wheel brake cylinder is a return feed pump, connected parallel to its wheel brake valve, whose suction side communicates with the wheel brake cylinder and whose compression side communicates with the master brake cylinder.

For the anti-lock control mode, the return feed pumps are turned on, and the wheel brake valve associated with the wheel brake cylinder of the vehicle wheel tending to lock is closed at least briefly, once. By variously long on and off times of the wheel brake valve (pulse width modulation), the average pressure of the brake fluid in the wheel brake cylinder can be reduced arbitrarily far compared with the brake fluid pressure in the master brake cylinder. The brake fluid pressure in the associated wheel brake cylinder thus has a sawtooth or triangular kind of course, as a result of which the pressure is modulated in such a way that the vehicle wheel does not lock.

ADVANTAGES OF THE INVENTION

The hydraulic brake system for a vehicle of the invention has a traction control device. It has the advantage that at minimal engineering expense, namely with a total of six magnet valves, a vehicle brake system with individual-wheel anti-lock control and with traction control can be realized. The two pumps of a brake circuit may for instance be embodied like the pumps is disclosed in the aforementioned U.S. Pat. No. 4,875,741, which is hereby incorporated by reference in this regard, or by a stepped piston pump, known per se. The return feed pump, to whose suction side the wheel brake cylinder of the non-driven vehicle wheel is connected, is according to the invention a self-aspirating pump, of the kind known per se.

For anti-lock control, the two return feed pumps are put into operation, and the brake fluid pressure in the wheel brake cylinder of a vehicle wheel that is tending to lock is reduced, for instance by pulse width modulation of the respective wheel brake valve. The switchover valve and wheel brake valves of wheel brake cylinders of the vehicle wheels not tending to lock remain in their open position.

For traction control, the return feed pumps are put into operation, the switchover valve is closed, and the wheel brake valve that precedes the wheel brake cylinder of the non-driven vehicle wheel remains open, so that the return feed pump, to whose suction side the wheel brake cylinder of the non-driven vehicle wheel is connected, pumps brake fluid to the wheel brake cylinder of the driven vehicle wheel, and builds up brake fluid pressure in it, thereby braking the driven vehicle wheel. The wheel brake valve of the wheel brake cylinder of the driven vehicle wheel remains open and the return feed pump to whose suction side the wheel brake cylinder of the driven vehicle wheel is connected pumps the quantity of brake fluid, which it draws from this wheel brake cylinder, back to the wheel brake cylinder through the wheel brake valve, so that it does not lower the brake fluid pressure in that wheel brake cylinder. If the brake fluid pressure is to be lowered, then the switchover valve is opened for a corresponding period of time.

The vehicle brake system of the invention has the further advantage that because of the individual-wheel pressure modulation, a distribution of braking force can be made, for instance between the front and rear axle, depending on the loading of the vehicle. A tendency to vehicle fishtailing can also be counteracted, if the driven vehicle wheels are the front wheels, which can be braked as in the traction control, if the rotary acceleration of the vehicle about its vertical axis exceeds a limit value, or in other words before the vehicle begins to fishtail.

The vehicle brake system of the invention is suitable not only for automobiles but also for motorcycles or other in-line-wheeled vehicles, which are equipped with a so-called integral brake system, or in other words in which one front and one rear wheel brake are each connected to a common brake circuit, typically a foot-actuated brake system.

One advantage is the use of controllable pressure limiting valves or controllable differential pressure valves as the wheel brake valves and/or as the switchover valve. These valves, which act like throttles of adjustable and also completely closable throttling cross section, make it possible to adjust the pressure in the wheel brake cylinders gradually to a pressure that averts locking of the vehicle wheels, in anti-lock control, and spinning of the driven vehicle wheels in traction control, or limits them to an acceptable value. The pressure in the wheel brake cylinders can be varied continuously and gradually and thus adapted to continuously changing requirements. Abrupt pressure changes, pressure pulsations and pressure spikes, which occur in brake pressure modulation with multiposition valves if these valves are switched over at high frequency between the open and the closed position, thereby accelerating brake fluid and then stopping it suddenly again, can be avoided by using pressure limiting valves or differential pressure valves.

In the automobile, continuous regulation of the pressure in the wheel brake cylinders with controllable pressure limiting valves or differential pressure valves merely has advantages in terms of passenger comfort and less strain on the hydraulic components of the vehicle brake system; but for motorcycles, it is nearly indispensable that the brake pressure in the wheel brake cylinders be regulated continuously and gradually, since an abrupt change between a braked and an unbraked vehicle wheel at high frequency such as occurs in brake pressure modulation with multiposition valves destabilizes a motorcycle, at least when cornering, and is highly likely to cause the motorcycle to crash.

BRIEF DESCRIPTION OF THE DRAWINGS

The invention will be described in further detail below in terms of three exemplary embodiments shown in the drawings. The three drawings show hydraulic circuit diagrams of three different modified vehicle brake systems according to the invention.

DESCRIPTION OF THE EXEMPLARY EMBODIMENTS

Figure 1:
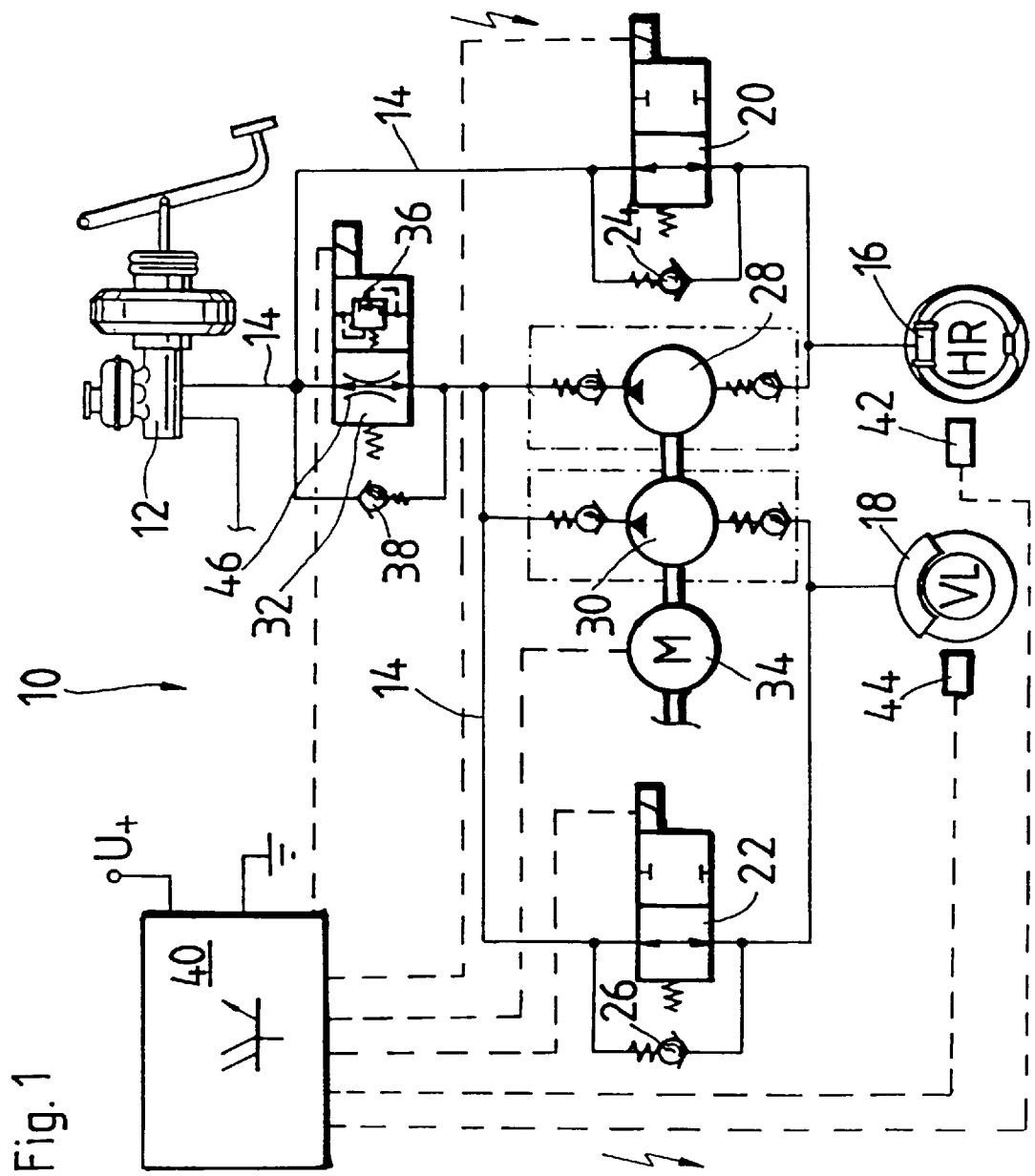

In FIG. 1, a brake circuit of a hydraulic vehicle brake system of the invention, identified overall by reference numeral 10, is shown. A second independent brake circuit, not shown, is analogous in structure and functions in the same way as the brake circuit shown. The two brake circuits are connected to a tandem master brake cylinder 12. The vehicle brake system 10 of the invention shown has an X-type brake distribution; that is, one front vehicle wheel and one diagonally opposed rear vehicle wheel are connected to one brake circuit. The left front and right rear wheel brakes are connected to the brake circuit shown. It is assumed that the front wheels are the driven vehicle wheels. The above assumptions have been made for the sake of clearly describing the invention but are not intended to limit the invention to the exemplary embodiments shown.

The two brake circuits of the vehicle brake system 10 of the invention are connected by a brake line 14 to one pressure chamber each of the tandem master brake cylinder 12; the brake line branches and leads to one wheel brake cylinder 16 of a non-driven rear vehicle wheel and one wheel brake cylinder 18 of a driven front vehicle wheel. Each wheel brake cylinder 16, 18 is preceded by one wheel brake valve 20, 22. The wheel brake valves 20, 22 are magnet valves that are open in their basic position. Connected parallel to each of them is a respective check valve 24, 26, through which the flow can be in the direction from the wheel brake cylinder 16, 18 to the master brake cylinder 12.

The wheel brake cylinders 16, 18 are connected to suction sides of two return feed pumps 28, 30, whose compression sides communicate with one another and are connected to the master brake cylinder 12 via a switchover valve 32. The switchover valve 32 is likewise a magnet valve that is open in its basic position.

The two return feed pumps 28, 30 are drivable with a pump motor 34 that is common to both brake circuits. The two return feed pumps 28, 30 may by way of example be embodied as a stepped piston pump known per se. The return feed pump 28, to whose suction side the wheel brake cylinder 16 of the non-driven vehicle wheel is connected, is self-aspirating.

Integrated into the switchover valve 32 is a pressure limiting valve 36, which is operative in the closed switching position of the switchover valve 32 and limits the pressure difference between the wheel brake cylinder side and the master brake cylinder to a predetermined value. The integrated pressure limiting valve 36 functions like a separate pressure limiting valve connected parallel to the switchover valve 32. Connected parallel to the switchover valve 32 is a check valve 38, through which there can be a flow in the direction from the master brake cylinder 12 to the wheel brake cylinders 16, 18.

The vehicle brake system 10 of the invention has an electronic control unit 40, which receives signals from wheel rotation sensors 42, 44 and which triggers the pump motor 34, the wheel brake valves 20, 22 and the switchover valve 32.

Conventional braking is done as usual by actuation of the master brake cylinder 12, which communicates with the wheel brake cylinders 16, 18 through the wheel brake valves 20, 22 that are open in their basic position.

For anti-lock control, if the threat of locking occurs at one of the vehicle wheels, the pump motor 34 is turned on, thus putting the return feed pumps 28, 30 into operation. If the front wheel is tending to lock, for instance, then wheel brake valve 22 associated with it is briefly closed at least once, while the return feed pump 30 to which the wheel brake cylinder 18 of the front wheel is connected pumps brake fluid out of the wheel brake cylinder 18, causing the brake fluid pressure in the wheel brake cylinder 18 to drop and reducing the braking force at the front wheel. The brake fluid that has been pumped out is delivered through the open switchover valve 32 to the master brake cylinder 12 or, depending on the position of the wheel brake valve 20, to the other wheel brake cylinder 16 and to the suction side of the return feed pump 28, to which the latter wheel brake cylinder 16 is connected. If the wheel brake valve 22 of the vehicle wheel that is tending to block is opened again, the brake fluid pressure in this wheel brake cylinder 18 rises again, and if the process is repeated multiple times, then the force of the brake fluid pressure in the wheel brake cylinder 18 is triangular or sawtoothlike.

If the other vehicle wheel, in the assumed case the rear wheel, is not tending to lock, then its wheel brake valve 20 remains open, and the quantity of brake fluid that is pumped away from the wheel brake cylinder 16 of the rear wheel by the return feed pump 28, to whose suction side this wheel brake cylinder 16 is connected and which is driven together with the other return feed pump 30, is returned to this wheel brake cylinder 16 again, through the open switchover valve 32 and the open wheel brake valve 20. Accordingly, the return feed pump 28, to whose suction side the wheel brake cylinder 16 of a vehicle wheel not tending to lock is connected, pumps brake fluid in a closed loop, and thus the brake fluid pressure in this wheel brake cylinder 16 is maintained.

The switchover valve 32 acts in its open position as a throttle, as indicated by reference numeral 46. This throttle 46 is disposed between the communicating pressure sides of the return feed pumps 28, 30 and the master brake cylinder 12. It reduces pressure surges that occur in the brake fluid pressure modulation, and thus reduces noise generation and feedback on the pedal. Accordingly, the throttle 46 of the switchover valve 32 perceptibly improves the passenger comfort of the vehicle brake system 10 of the invention.

To further reduce noise generation and feedback on the pedal, the switchover valve 32 may be triggered, that is, closed, during the anti-lock control mode. A return of brake fluid from the wheel brake cylinders 16, 18 can be accomplished only through the pressure limiting valve 36. Because of the opening pressure of the pressure limiting valve 36, the return pumping is throttled substantially more markedly than the pumping through the open switchover valve 32 acting as a throttle 46, thus increasing passenger comfort still more. A buildup of brake fluid pressure in the wheel brake cylinder 16 of the non-driven rear wheel by means of the master brake cylinder 12 is not hindered by the closed switchover valve 32, since the valve is not incorporated into the brake line 14 leading to this wheel brake cylinder 16. The buildup of brake fluid pressure is effected to the wheel brake cylinder 18 of the driven front wheel through the check valve 38 connected parallel to the switchover valve 32, when the switchover valve is closed. The brake fluid pressure in the wheel brake cylinders 16, 18 and hence the braking force of the vehicle wheels can accordingly be increased rapidly at any time, for instance if the coefficient of friction of the road surface increases abruptly.

If both of the vehicle wheels connected to one brake circuit are tending to lock, then pressure surges caused by brake fluid pressure modulation, and the attendant noise generation and feedback on the pedal, can all be limited by triggering the two wheel brake valves 20, 22 diametrically oppositely, so that when the brake fluid pressure rises in the wheel brake cylinder 18 of the front wheel, the brake fluid pressure in the wheel brake cylinder 16 of the rear wheel drops, and vice versa. Although in all more brake fluid is needed in the wheel brake cylinders 16, 18, nevertheless it can be drawn from the master brake cylinder 12 at any time, through the check valve 38 disposed parallel to the closed switchover valve 32.

When the drive slip is excessively high, the anti-lock control unit functions as follows: If the driven vehicle wheel, which in the exemplary embodiment is the front wheel, upon acceleration and especially upon startup begins to spin, then the pump motor 34 is turned on, which puts the return feed pumps 28, 30 into operation, and the switchover valve 32 is closed. The self-aspirating return feed pump 28, to whose suction side the wheel brake cylinder 16 of the non-driven vehicle wheel is connected, aspirates brake fluid out of the master brake cylinder 12 from the open wheel brake valve 20 that precedes this wheel brake cylinder 16. This brake fluid, through the wheel brake valve 22 that precedes the wheel brake cylinder 18 of the driven vehicle wheel, reaches this wheel brake cylinder 18, and thus the vehicle wheel is braked in order to prevent spinning.

Since the return feed pump 30, to whose suction side the wheel brake cylinder 18 of the spinning vehicle wheel is driven together with the other return feed pump 28 by the pump motor 34, this return feed pump 30 aspirates brake fluid from the wheel brake cylinder 18. The aspirated amount of brake fluid is returned to the wheel brake cylinder 18 again by the wheel brake valve 22; that is, the return feed pump 30 pumps in a closed loop and therefore does not lower the brake fluid pressure in the wheel brake cylinder 18 of the driven vehicle wheel.

To reduce the braking force, the brake fluid pressure in the wheel brake cylinder 18 of the driven vehicle wheel is lowered by closing the wheel brake valve 22 of the driven vehicle wheel and opening the switchover valve 32. To reduce the brake fluid pressure in the wheel brake cylinder 18 of the driven vehicle wheel, the wheel brake valve 22 preceding this cylinder can also be closed, and the switchover valve 32 can be kept closed, and as a result brake fluid is pumped out of the wheel brake cylinder 18 by the return feed pump 30 through the pressure limiting valve 36 of the closed switchover valve 32 to the master brake cylinder 12.

Figure 2:
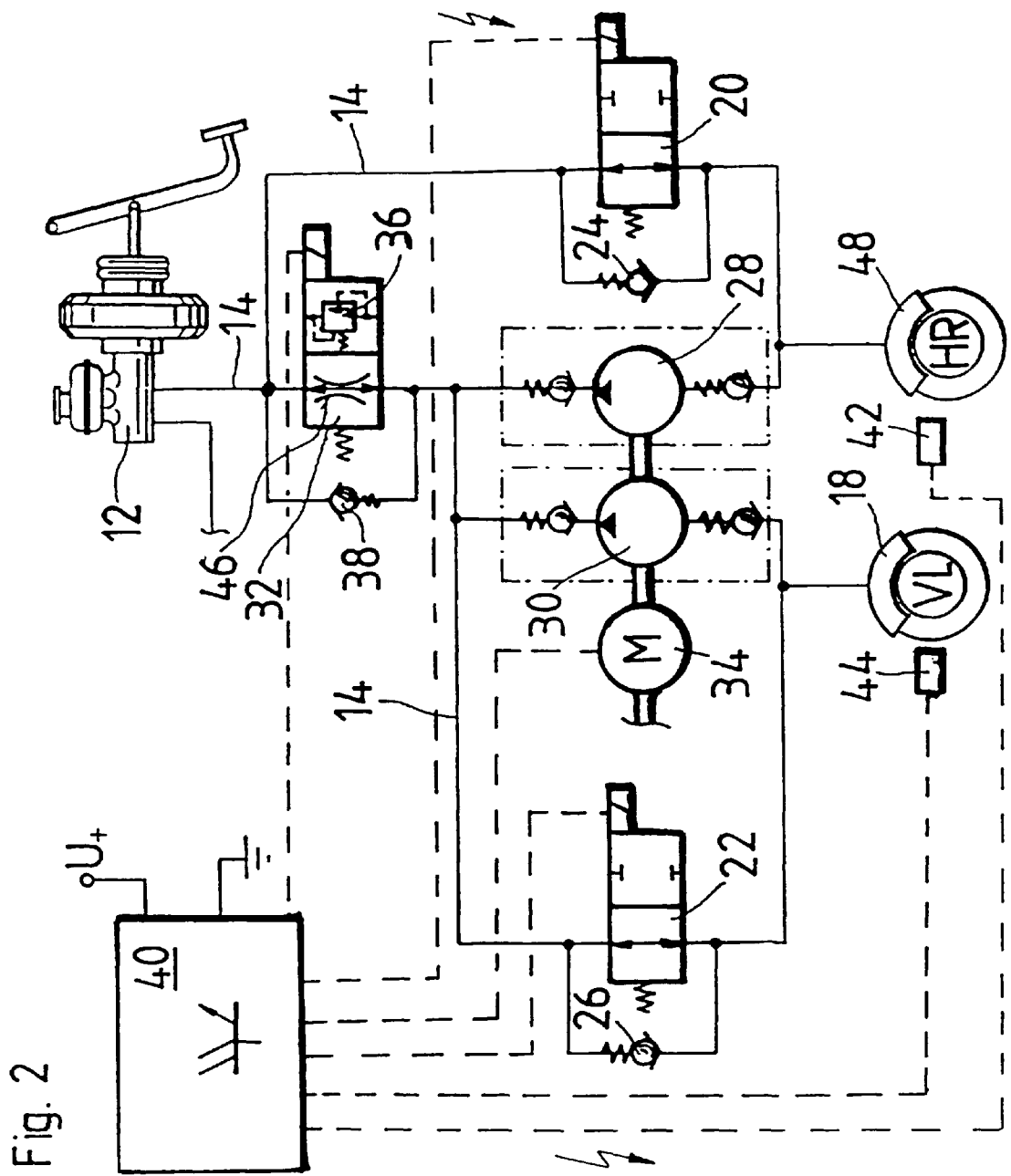

In this process, the wheel brake valve 20 of the other wheel brake cylinder 16 of the non-driven vehicle wheel remains open; that is, its return feed pump 28 aspirates brake fluid from the master brake cylinder 12 and pumps it through the pressure limiting valve 36 back to the master brake cylinder 12. Because of the opened wheel brake valve 20, the return feed pump 28 functions unhindered in the closed loop and does not draw any brake fluid from the wheel brake cylinder 16. This prevents the generation of negative pressure in the wheel brake cylinder 16 of the non-driven vehicle wheel. As a consequence, a disk brake can be used without reservation in the non-driven vehicle wheel, as shown in FIG. 2, since the air play of a disk brake could increase if there is negative pressure in its wheel brake cylinder 48. Otherwise, a drum brake may be provided on the non-driven vehicle wheel, as shown in FIG. 1. This brake typically has a readjusting device, known per se and to be actuated automatically or manually, for readjusting the air play as brake lining wear increases.

With the exception of the disk brake on the non-driven vehicle wheel, the vehicle brake system of the invention, shown in FIG. 2, has the same structure as the vehicle brake system 10 shown in FIG. 1 and functions in the same way. Identical reference numerals are used for components that agree with one another in both figures. To avoid repetition, with regard to FIGS. 2 and 3 the corresponding description of FIG. 1 is referred to. The driven vehicle wheels may be equipped with disk brakes or drum brakes arbitrarily.

In addition, the pumping capacity of the return feed pumps 28, 30 and thus the brake fluid pressure in the wheel brake cylinders 16, 18 can be adjusted to a required level by regulating the rpm of the pump motor 34. The rpm regulation is effected for instance by briefly turning the pump motor on and off, or in other words by pulse width modulation of the supply of current to the pump motor 34.

Figure 3:
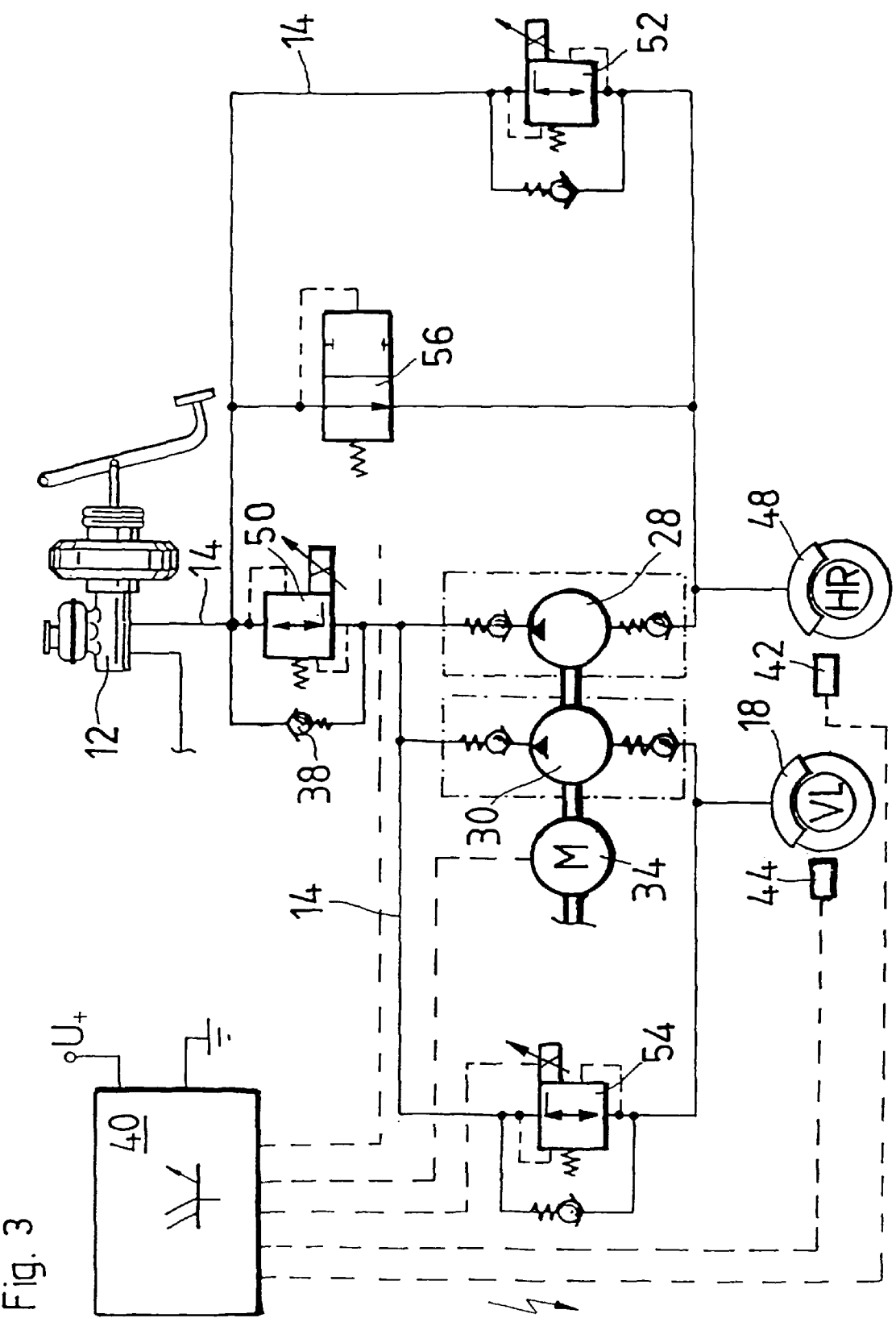

In the embodiment of the invention shown in FIG. 3, the switchover valve 32 and the wheel brake valves 20, 22 are replaced by magnetic differential pressure valves 50, 52, 54 that can be controlled by the electronic control unit 40. Also in the embodiment of a vehicle brake system of the invention, shown in FIG. 3, the suction side of the self-aspirating return feed pump 28, to which the wheel brake cylinder 48 of the non-driven vehicle wheel (in this exemplary embodiment, a rear wheel) is again connected, is connected to the master brake cylinder 12 via an intake valve 56. The intake valve 56 may be embodied as a 2/2-way magnet valve which is closed in its basic position and which is actuated (not shown) by the control unit 40. In the exemplary embodiment shown, the intake valve is a hydraulically controlled 2/2-way valve that is open in its basic position, which is closed by the pressure generated in the master brake cylinder 12. This intake valve 56, which like the brake line leading from the master brake cylinder 12 to it and from it to the suction side of the self-aspirating return feed pump 28 has a large flow cross section, reduces the intake resistance of the self-aspirating return feed pump 28 during slip control when the master brake cylinder 12 is not actuated, and as a result the pressure buildup is effected faster.

The foregoing relates to preferred exemplary embodiments of the invention, it being understood that other variants and embodiments thereof are possible within the spirit and scope of the invention, the latter being defined by the appended claims.

We claim:

1. A hydraulic brake system for a vehicle comprising a master brake cylinder, from which a branching brake line leads to one wheel brake cylinder of a driven vehicle wheel and one wheel brake cylinder of a nondriven vehicle wheel, each wheel brake cylinder being preceded by a wheel brake valve (20,22), two return feed pumps (28, 30), each one of said return feed pumps (28, 30) is connected parallel to one of said wheel brake valves (20, 22), a suction side of each of the return feed pumps communicates with a wheel brake cylinder and a compression side of the return feed pumps communicates with the master brake cylinder, the return feed pump (28) connected to the wheel brake cylinder (16) of the non-driven vehicle wheel is self-aspirating; the vehicle brake system (10) has a switchover valve (32; 50), said switchover valve is disposed between the compression side of the return feed pumps (28, 30) and the master brake cylinder (12), the switchover valve (32; 50) being connected between the master brake cylinder (12) and the wheel brake cylinder (18) of the driven vehicle wheel, and the wheel brake valve (20) for the wheel brake cylinder (16) of the non-driven vehicle wheel being connected to the master brake cylinder (12) is connected parallel to the switchover valve (32; 50), putting the return feed pumps (28, 30) into operation with the wheel brake valves (20, 22) open; and closing the switchover valve (32) at least once briefly with a pulse width modulation, and adjusting the rpm of the pump motor (34) by briefly turning the pump motor on and off.

2. A vehicle brake system as defined by claim 1, in which a pressure limiting valve (36) is connected parallel to the switchover valve (32).

3. A vehicle brake system as defined by claim 2, in which a check valve (38), through which the flow can be in a direction from the master brake cylinder (12) to the wheel brake cylinder (18) of the driven vehicle wheel, is connected parallel to the switchover valve (32) and enables an unthrottled buildup of brake pressure in the wheel brake cylinder (18) of the driven vehicle wheel.

4. A method for operating a vehicle brake system as defined by claim 2, in which the return feed pump is put into operation when a vehicle wheel is tending to lock, and in order to modulate the brake fluid pressure in the wheel brake cylinder (16, 18) of the vehicle wheel that is tending to lock, briefly closing the wheel brake valve (20, 22) preceding the wheel brake cylinder (16, 18) at least once.

5. The method as defined by claim 4, in which the switchover valve (32) is closed.

6. A vehicle brake system as defined by claim 1, in which a check valve (38), through which the flow can be in a direction from the master brake cylinder (12) to the wheel brake cylinder (18) of the driven vehicle wheel, is connected parallel to the switchover valve (32) and enables an unthrottled buildup of brake pressure in the wheel brake cylinder (18) of the driven vehicle wheel.

7. A vehicle brake system as defined by claim 1, in which the suction side of the return feed pump (28), to whose suction side the wheel brake cylinder (16; 48) of the non-driven vehicle wheel is connected, is likewise connected to the master brake cylinder (12) via an intake valve (56).

8. A vehicle brake system as defined by claim 7, in which the intake valve (56) is a valve hydraulically controlled by the pressure generated in the master brake cylinder (12).

9. A method for operating a vehicle brake system as defined by claim 1, which comprises putting the return feed pumps (28, 30) into operation when a vehicle wheel is tending to lock, and triggering the wheel brake valves (20, 22) in alternation in order to modulate the brake fluid pressure in the wheel brake cylinders (16, 18).

10. A method for operating a vehicle brake system as defined by claim 2, which comprises putting the return feed pumps (28, 30) into operation when a vehicle wheel is tending to lock, and triggering the wheel brake valves (20, 22) in alternation in order to modulate the brake fluid pressure in the wheel brake cylinders (16, 18).

11. A method for traction control in a vehicle brake system as defined by claim 2, which comprises putting the return feed pumps (28, 30) into operation with the wheel brake valves (20, 22) open; and closing the switchover valve (32) at least once briefly with a pulse width modulation.

12. A method for traction control in a vehicle brake system as defined by claim 2, which comprises putting the return feed pumps (28, 30) into operation with the wheel brake valve (20) of the non-driven vehicle wheel remaining open; closing the switchover valve (32); modulating the brake fluid pressure in the wheel brake cylinder (18) of the driven vehicle wheel, and briefly closing the wheel brake valve (22) preceding actuation of the wheel brake cylinder at least once, with a pulse width modulation.

13. A hydraulic brake system for a vehicle comprising a master brake cylinder, from which a branching brake line leads to one wheel brake cylinder of a driven vehicle wheel and one wheel brake cylinder of a nondriven vehicle wheel, each wheel brake cylinder being preceded by a wheel brake valve (20, 22), two return feed pumps (28, 30), each one of said return feed pumps (28, 30) is connected parallel to one of said wheel brake valves (20, 22), a suction side of each of the return feed pumps communicates with a wheel brake cylinder and a compression side of the return feed pumps communicates with the master brake cylinders, the return feed pump (28) connected to the wheel brake cylinder (16) of the non-driven vehicle wheel is self-aspirating; the vehicle brake system (10) has a switchover valve (32; 50), said switchover valve is disposed between the compression side of the return feed pumps (28, 30) and the master brake cylinder (12), the switchover valve (32; 50) being connected between the master brake cylinder (12) and the wheel brake cylinder (18) of the driven vehicle wheel, and the wheel brake valve (20) for the wheel brake cylinder (16) of the non-driven vehicle wheel being connected to the master brake cylinder (12) is connected parallel to the switchover valve (32; 50), a pressure limiting valve (36) is connected parallel to the switchover valve (32), putting the return feed pumps (28, 30) into operation with the wheel brake valve (20) of the non-driven vehicle wheel remaining open; closing the switchover valve (32); modulating the brake fluid pressure in the wheel brake cylinder (18) of the driven vehicle wheel, and briefly closing the wheel brake valve (22) preceding actuation of the wheel brake cylinder at least once, with a pulse width modulation, and adjusting the rpm of the pump motor (34) by briefly turning the pump motor on and off.

14. A hydraulic brake system for a vehicle comprising a master brake cylinder, from which a branching brake line leads to one wheel brake cylinder of a driven vehicle wheel and one wheel brake cylinder of a nondriven vehicle wheel, each wheel brake cylinder being preceded by a wheel brake valve (20, 22) two return feed pumps (28, 30), each one of said return feed pumps (28, 30) is connected parallel to one of said wheel brake valves (20, 22), a suction side of each of the return feed pumps communicates with a wheel brake cylinder and a compression side of the return feed pumps communicates with the master brake cylinder and a compression side of the return feed pumps communicates with the master brake cylinder, the return feed pump (28) connected to the wheel brake cylinder (16) of the non-driven vehicle wheel is self-aspirating; the vehicle brake system (10) has a switchover valve (32; 50), said switchover valve is disposed between the compression side of the return feed pumps (28, 30) and the master brake cylinder (12), the switchover valve (32; 50) being connected between the master brake cylinder (12) and the wheel brake cylinder (18) of the driven vehicle wheel, and the wheel brake valve (20) for the wheel brake cylinder (16) of the non-driven vehicle wheel being connected to the master brake cylinder (12) is connected parallel to the switchover valve (32; 50), the wheel brake valve is embodied as a controllable differential pressure valve (52, 54), the switchover valve is embodied as a controllable differential pressure valve (50) or as a controllable pressure limiting valve, and said controllable differential pressure valve (52, 54) and said switchover valve (50) are controllable by variable forces of magnets, and the forces of the magnets are adjusted by an electronic control unit (40).

* * * * *